US008885292B1

(12) United States Patent
Kuribara

(10) Patent No.: US 8,885,292 B1
(45) Date of Patent: Nov. 11, 2014

(54) INSULATING MEMBER AND DISK DEVICE WITH THE SAME

(71) Applicant: Kabushiki Kaisha Toshiba, Tokyo (JP)

(72) Inventor: Hirofumi Kuribara, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/251,093

(22) Filed: Apr. 11, 2014

Related U.S. Application Data

(60) Provisional application No. 61/932,677, filed on Jan. 28, 2014.

(51) Int. Cl.
*G11B 33/08* (2006.01)
(52) U.S. Cl.
USPC ...................................... 360/97.19
(58) Field of Classification Search
None
See application file for complete search history.

(56) References Cited

U.S. PATENT DOCUMENTS

| 5,149,048 A | 9/1992 | Morehouse et al. | |
| 6,288,866 B1 * | 9/2001 | Butler et al. | 360/97.19 |
| 6,697,217 B1 * | 2/2004 | Codilian | 360/99.18 |
| 6,961,219 B2 * | 11/2005 | Asano et al. | 360/266 |
| 7,241,359 B2 | 7/2007 | Kumakura | |
| 2004/0071989 A1 | 4/2004 | Kumakura | |
| 2005/0219738 A1 | 10/2005 | Iida et al. | |
| 2005/0237663 A1 * | 10/2005 | Nguyen | 360/97.01 |
| 2006/0198045 A1 | 9/2006 | Lim et al. | |
| 2009/0107697 A1 * | 4/2009 | Price et al. | 174/137 B |

FOREIGN PATENT DOCUMENTS

| JP | H10-088724 A | 4/1998 |
| JP | 2002-260468 A | 9/2002 |
| JP | 2005-293717 A | 10/2005 |

* cited by examiner

*Primary Examiner* — Paul Huber
(74) *Attorney, Agent, or Firm* — Knobbe Martens Olson & Bear LLP

(57) ABSTRACT

According to one embodiment, a disk device includes a disk recording medium, a drive motor, an actuator, a housing which accommodates the recording medium, the drive motor, and the actuator, a printed circuit board opposed to an outer surface of the housing, and an insulating sheet interposed between the printed circuit board and the outer surface of the housing. The insulating sheet has rigidity and elasticity and includes a convex portion. The convex portion has a height not smaller than a clearance between the printed circuit board and the outer surface of the housing and is sandwiched between the printed circuit board and the outer surface of the housing.

11 Claims, 9 Drawing Sheets

INSULATING MEMBER AND DISK DEVICE WITH THE SAME

CROSS-REFERENCE TO RELATED APPLICATIONS

This application claims the benefit of U.S. Provisional Application No. 61/932,677, filed Jan. 28, 2014, the entire contents of which are incorporated herein by reference.

FIELD

Embodiments described herein relate generally to an insulating member and a disk device comprising the same.

BACKGROUND

In recent years, disk devices, such as magnetic disk drives, optical disc drives, etc., have become widely used as external recording devices of computers and image recording devices.

In general, a disk device, for example, a magnetic disk drive (HDD), comprises a housing and a printed circuit board (PCB) opposed to the bottom surface of the housing. The housing accommodates a recording medium, magnetic head, actuator configured to move the magnetic head, etc. An insulator (insulating sheet or film) is interposed between the PCB and the bottom surface of the housing.

In recent HDDs, the recording surface density of a magnetic disk is so high that it is more and more difficult to improve the actuator control accuracy. There is a method of achieving a required equipment performance in this situation. According to this method, the actuator control accuracy is improved by providing, on the PCB of the HDD, a rotational vibration sensor (or acceleration sensor, hereinafter referred to as the "RV sensor") for detecting vibration in the direction of rotation relative to the actuator.

Although the vibration detection by the RV sensor is highly effective for suppressing simple vibration in the rotational direction of the actuator, the vibration may sometimes produce noise, thereby reducing the improvement effect of the actuator control accuracy, in the case where the PCB itself vibrates.

Accordingly, a proposal has been made to use a foam material with damping properties for the insulator interposed between the PCB and the housing of the HDD. However, the use of this type insulator as a component results in an increase in material cost. Although a flat insulating sheet and film are low-cost insulators, they cannot meet the requirement of damping performance.

DETAILED DESCRIPTION

Various embodiments will be described hereinafter with reference to the accompanying drawings. In general, according to one embodiment, a disk device comprises a disk recording medium; a drive motor configured to support and rotate the recording medium; an actuator configured to support a head for movement relative to the recording medium; a housing which accommodates the recording medium, the drive motor, and the actuator; a printed circuit board opposed to an outer surface of the housing; and an insulating sheet interposed between the printed circuit board and the outer surface of the housing. The insulating sheet is made of a material having rigidity and elasticity and comprises at least one convex portion, the convex portion having a height not smaller than a clearance between the printed circuit board and the outer surface of the housing and being sandwiched between the printed circuit board and the outer surface of the housing.

The following is a detailed description of hard disk drives (HDDs) according to embodiments as disk devices.

First Embodiment

Figure 1:
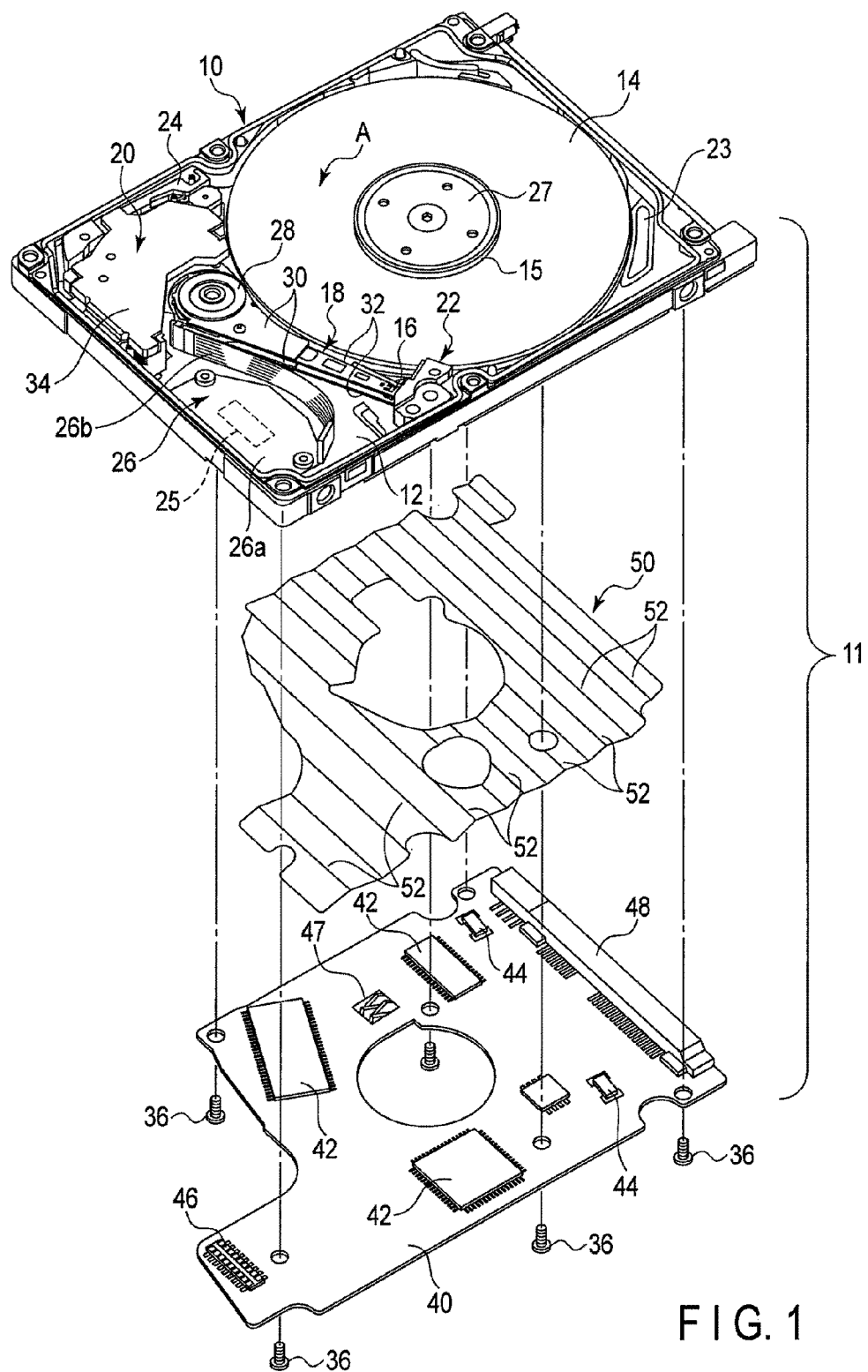
FIG. 1 is an exploded perspective view of a hard disk drive (HDD) according to a first embodiment.
Figure 2:
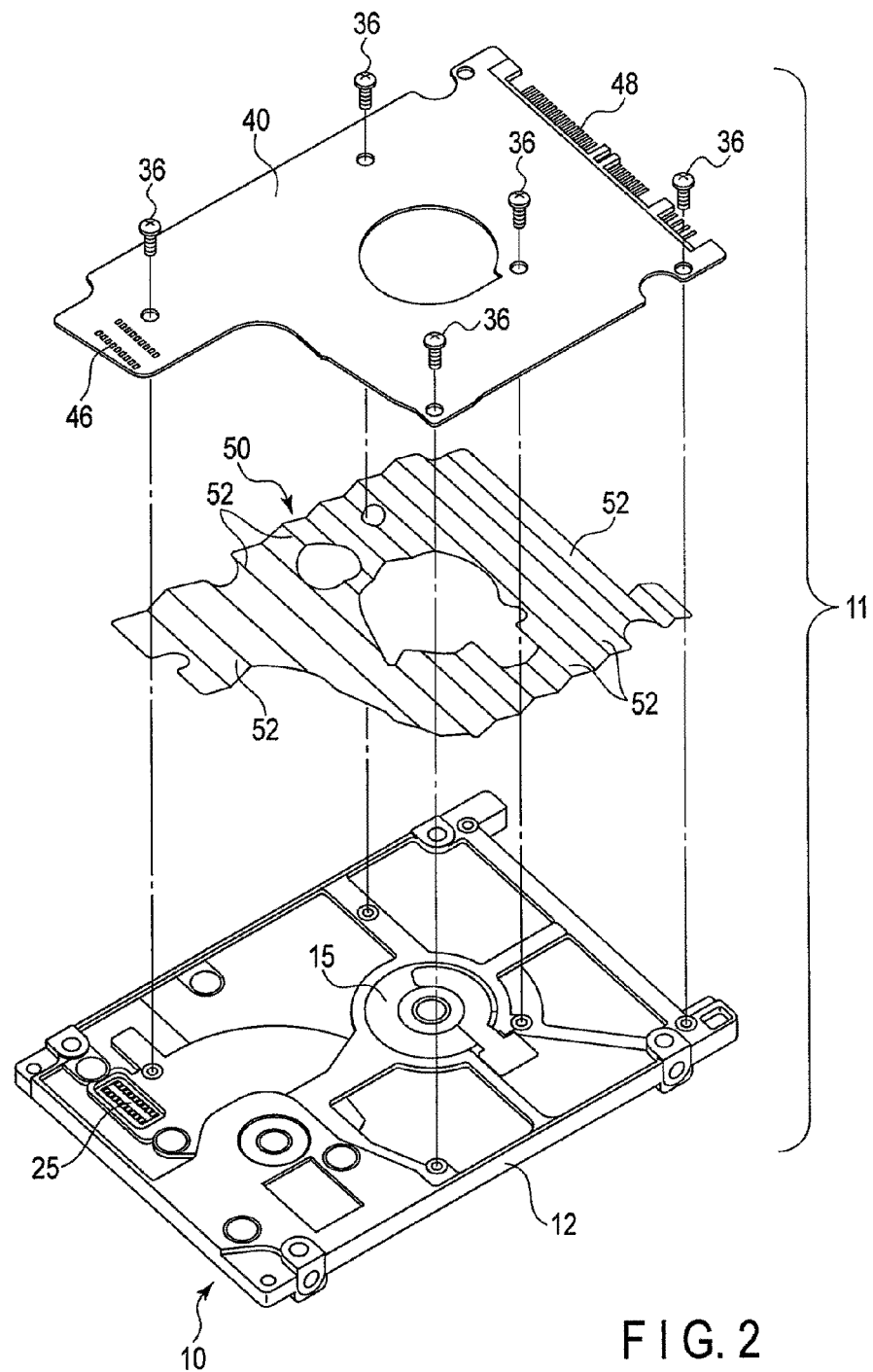
FIG. 2 is an exploded perspective view of the HDD taken from the bottom side.
Figure 3:
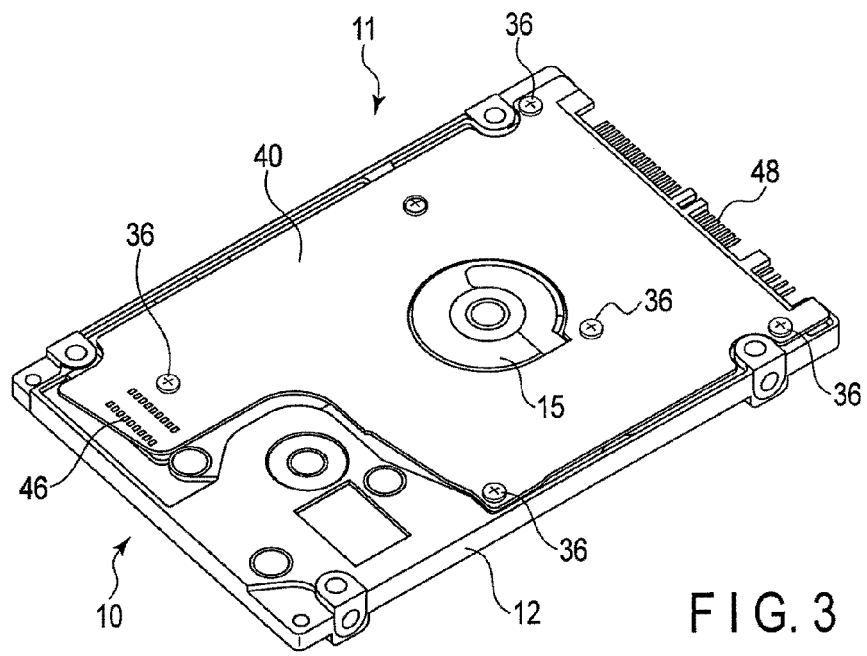
FIG. 3 is a perspective view showing the bottom side of the HDD.

FIG. 1 is an exploded perspective view showing a hard disk drive (HDD) according to a first embodiment as a disk device, and FIG. 2 is an exploded perspective view of the HDD taken from the bottom side. FIG. 3 is a perspective view showing the bottom side of the HDD.

As shown in FIGS. 1 and 2, an HDD 11 comprises a flat, substantially rectangular housing 10. The housing 10 comprises a base 12 in the form of an open-topped rectangular box and the top cover (not shown) in the form of a rectangular plate. The base 12 comprises a rectangular bottom wall opposed to the top cover with a gap therebetween and a sidewall set up along the peripheral edge of the bottom wall. The top cover is attached to the sidewall of the base 12 by screws so as to close the top opening of the base. Thus, the housing 10 is kept airtight inside and can communicate with the outside through a breathing filter 23 only.

The base 12 carries thereon a magnetic disk 14, as a recording medium, and a mechanism section, which are accommodated in the housing 10. The mechanism section comprises a spindle motor 15, a plurality (for example, two) of magnetic heads 16, head actuator 18, and voice coil motor (VCM) 20. The spindle motor 15 supports and rotates the magnetic disk 14. The magnetic heads 16 record and reproduce data in and from the magnetic disk 14. The head actuator 18 supports the magnetic heads 16 for movement relative to the surface of the magnetic disk 14. The VCM 20 pivots and positions the head actuator 18. The base 12 further carries a ramp loading mechanism 22, latch mechanism 24, and board unit 26. The ramp loading mechanism 22 holds the magnetic heads 16 in positions off the magnetic disk 14 when the magnetic heads 16 are moved to the outermost periphery of the magnetic disk 14. The latch mechanism 24 holds the head actuator 18 in a retracted position if the HDD is jolted, for example. Electronic components, such as a conversion connector 25, are mounted on the board unit 26.

The magnetic disk 14 has a diameter of, for example, 63.5 mm (2.5 inches) and comprises magnetic recording layers on its upper and lower surfaces, individually. The magnetic disk 14 is coaxially fitted on the hub (not shown) of the spindle motor 15 and clamped and secured to the hub by a clamp spring 27. Thus, the magnetic disk 14 is supported parallel to the bottom wall of the base 12. The magnetic disk 14 is rotated at a predetermined speed in the direction of arrow A by the spindle motor 15.

As shown in FIG. 1, the head actuator 18 comprises a bearing unit 28 secured to the bottom wall of the base 12 and a plurality of arms 30 extending from the bearing unit 28. The arms 30 are located parallel to the surfaces of the magnetic disk 14 and at predetermined intervals and extend in the same direction from the bearing unit 28. The head actuator 18 comprises elastically deformable suspensions 32 each in the form of an elongated plate. Each suspension 32 is formed of a plate spring, the proximal end of which is secured to the distal end of its corresponding arm 30 by spot welding or adhesive bonding and which extends from the arm. Each magnetic head 16 is supported on an extended end of its corresponding suspension 32.

As shown in FIG. 1, the board unit 26 comprises an FPC main body 26a formed of a flexible printed circuit board and a main FPC 26b extending from the FPC main body. The FPC main body 26a is secured to the bottom surface of the base 12. The conversion connector 25 on the FPC main body 26a is located in an opening in the bottom wall of the base 12. An extended end of the main FPC 26b is connected to the head actuator 18 and also connected to each magnetic head 16 through a relay FPC (not shown). Thus, the board unit 26 is electrically connected to the magnetic head 16 through the main FPC 26b and the relay FPC.

The VCM 20 comprises a support frame (not shown) extending from the bearing 28 in the direction opposite to the arms 30 and a voice coil supported on the support frame. When the head actuator 18 is assembled on the base 12, the voice coil is located between a pair of yokes 34 that are secured to the base 12. Thus, the voice coil, along with these yokes and a magnet secured to one of the yokes, constitutes the VCM 20.

If the voice coil of the VCM 20 is energized with the magnetic disk 14 rotating, the head actuator 18 pivots about the bearing 28, whereupon each magnetic head 16 is moved to and positioned above a desired track of the magnetic disk 14. As this is done, the magnetic heads 16 are moved radially relative to the magnetic disk 14 between the inner and outer peripheral edge portions of the magnetic disk 14.

As shown in FIGS. 1 to 3, a printed circuit board (or control circuit board) 40 is attached to the outer surface (or bottom surface) of the bottom wall of the base 12 by screws 36 so as to face the bottom wall in a spaced manner. An insulating sheet (or insulating film) 50 for use as an insulating member is interposed between the printed circuit board 40 and the outer surface of the bottom wall of the base 12.

A plurality of semiconductor devices 42 and semiconductor chips, which constitute a control unit, and two rotational vibration sensors (or acceleration sensors) 44 for detecting vibration are mounted on the inner surface (facing the base 12) of the printed circuit board 40. The rotational vibration sensors 44 serve to detect vibration produced in the HDD 11 comprising the housing 10 and printed circuit board 40, for example, vibration of the HDD 11 in the direction to pivot the head actuator 18 in this case. A connector 46 is provided on one longitudinal end side of the printed circuit board 40, while an interface connector 48 connectable with an external device is mounted on the other longitudinal end side of the printed circuit board 40. A connection terminal 47 for the spindle motor 15 is provided on a longitudinal central portion of the printed circuit board 40.

When the printed circuit board 40 is attached to the base 12, the connector 46 is connected to the conversion connector 25 of the board unit 26. Further, the connection terminal 47 is connected to a connection terminal of the spindle motor 15. The control unit of the printed circuit board 40 controls the operations of the VCM 20 and magnetic heads 16 through the board unit 26 and also controls the operation of the spindle motor 15 through the connection terminal 47. Further, the control unit of the printed circuit board 40 controls the pivoting motion of the head actuator 18 in response to the vibration detection by the rotational vibration sensors 44.

Figure 4:
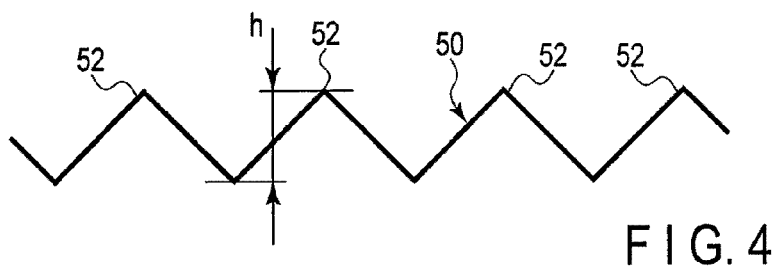
FIG. 4 is a side view of an insulating sheet of the HDD.
Figure 5:
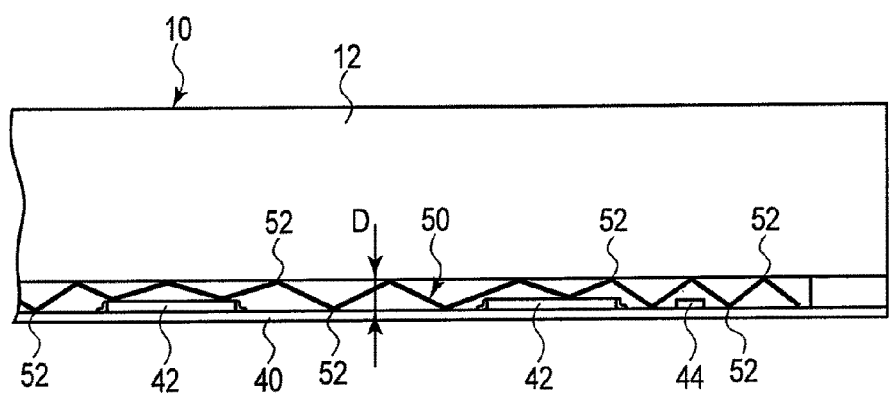
FIG. 5 is a sectional view schematically showing a part of the HDD.

The following is a description of the insulating sheet (or insulating film) 50. FIG. 4 is a sectional view of the insulating sheet, and FIG. 5 is a side view schematically showing a part of the HDD. As shown in FIGS. 1, 2, 4 and 5, the insulating sheet 50 is formed with substantially the same shape and size as those of the printed circuit board 40. The insulating sheet 50 is a sheet or film of a material having insulating properties, rigidity, and elasticity and capable of maintaining a folded shape (plastically deformable) by folding work (described later). For example, the material may be polycarbonate or a polyester-based material, such as polyethylene terephthalate (PET). While the insulating sheet 50 is often formed to be about 0.05 to 0.1 mm thick, the thickness is determined in consideration of its strength, material cost, etc.

The insulating sheet 50 comprises at least one folded portion (or convex or three-dimensional portion) and is solidified. Specifically, the insulating sheet 50 is formed with a three-dimensional shape based on the folded portion. This three-dimensional shape is formed by previously folding (for example, folding by means of a mold or the like) a flat insulating sheet. According to the present embodiment, the insulating sheet 50 is folded like a bellows and comprises a plurality of folded portions (or convex portions) 52 over its entire surface. The folded portions 52 project toward the base 12 or the printed circuit board 40, or on both sides. Further, the folded portions 52 continuously extend parallel to each other in one direction from one side of the insulating sheet 50 to the other. The insulating sheet 50 comprises the folded portions 52 that contact the printed circuit board 40 in the vicinity of the rotational vibration sensors 44 or directly contact the sensors 44.

The profile (or cross-sectional shape) of each folded portion 52 may take any of a variety of chosen shapes, such as triangular. Further, height h of each folded portion 52 is not smaller than distance (clearance) D between the printed circuit board 40 and the outer surface of the housing 10. Respective heights h of the folded portions 52 may be made equal to one another or varied depending on the location, that is, on the clearance between the printed circuit board 40 and the outer surface of the housing 10.

As shown in FIG. 5, the insulating sheet 50 constructed in this manner is interposed between the printed circuit board 40 and the outer surface of the bottom wall of the base 12, thereby electrically insulating them. As the insulating sheet 50 is sandwiched between the base 12 and printed circuit board 40, each folded portion (or convex portion) 52 of the insulating sheet 50 is elastically held and squeezed from both sides in such a manner that its top and bottom sides contact the printed circuit board 40 and the bottom surface of the base 12, respectively. Thus, the folded portions 52 stretch based on their own rigidity and elasticity and elastically support the printed circuit board 40, thereby damping and suppressing vibration of the printed circuit board 40. Further, some of the folded portions 52 may be configured to contact the semiconductor devices 42 or rotational vibration sensors 44 on the printed circuit board 40.

Figure 6:
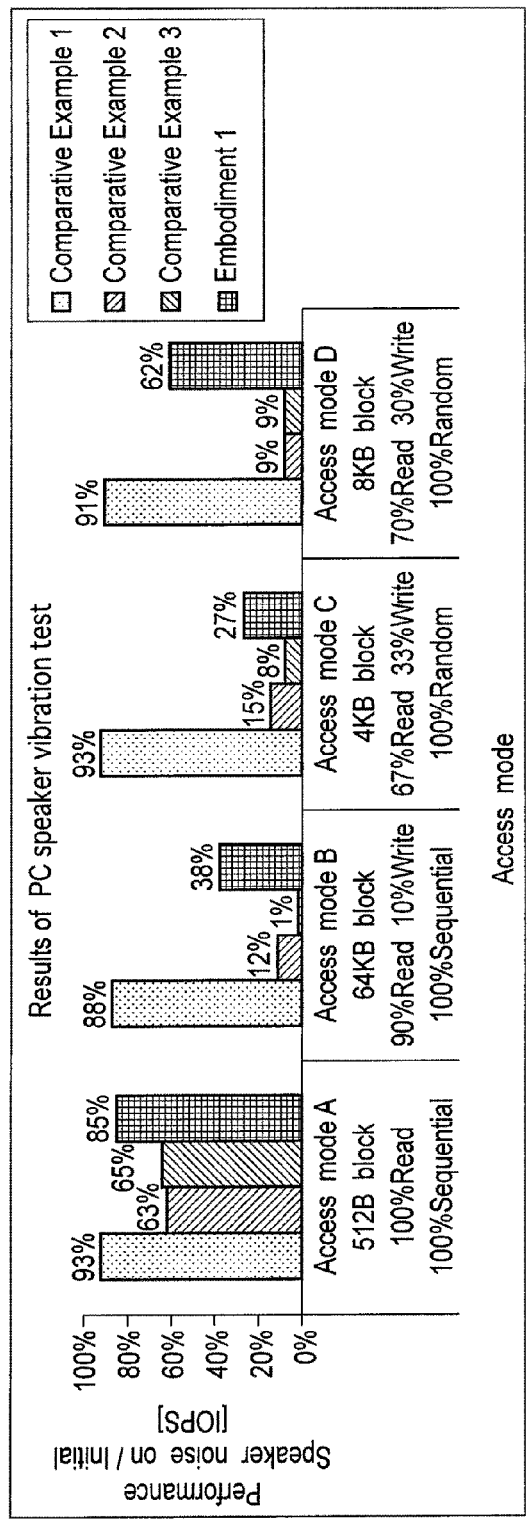
FIG. 6 is a diagram comparatively showing vibration suppression effects of the insulating sheet of the HDD according to the first embodiment, insulating sheets and a damping material according to comparative examples.

FIG. 6 shows the results of a vibration test on the HDD according to the present embodiment and HDDs according to Comparative Examples 1, 2 and 3. The HDD of Comparative Example 1 uses a damping foam as an insulator. The HDD of Comparative Example 2 uses a flat insulating sheet without folded portions. The HDD of Comparative Example 3 does not comprise an insulator (insulating sheet or damping foam).

In FIG. 6, the ordinate represents the data input/output performance (IOPS) of the HDD. IOPS ratios for white-noise-playback on and off states are acquired from a speaker attached to a notebook computer. In FIG. 6, higher percentages (%) indicate higher performance and higher vibration suppression effects. The IOPS ratios are evaluated in four assumed access modes A, B, C and D for an actual use environment of the computer. These access modes A to D are different from one another in read/write ratio and sequential and random access ratios.

For all of the access modes, as shown in FIG. 6, the HDD according to the present embodiment is superior in performance to the HDD of Comparative Example 2 that uses the flat insulating film and the HDD of Comparative Example 3 without an insulator, although it is inferior to the HDD of Comparative Example 1 that uses the damping foam. Thus, it is indicated that the HDD of the present embodiment can suppress vibration of the printed circuit board 40.

According to the HDD of the present embodiment, as described above, vibration of the printed circuit board that causes degradation of the operating accuracy of the rotational vibration sensors for the actuator can be suppressed by the single insulating sheet. The insulating sheet to be solidified should be folded by means of a mold or the like. Since the insulating sheet used can be only a single article and requires folding work using a mold or the like, however, the material cost of the insulator can be made lower than in the case where the damping foam is used. Thus, there can be provided an insulating sheet and an HDD, reduced in cost and excellent in vibration suppression effect.

The following is a description of insulating sheets of HDDs according to alternative embodiments. In the description of these alternative embodiments to follow, like reference numerals are used to designate the same parts as those in the first embodiment, and a detailed description thereof may be omitted in some cases.

Second Embodiment

Figure 7A:
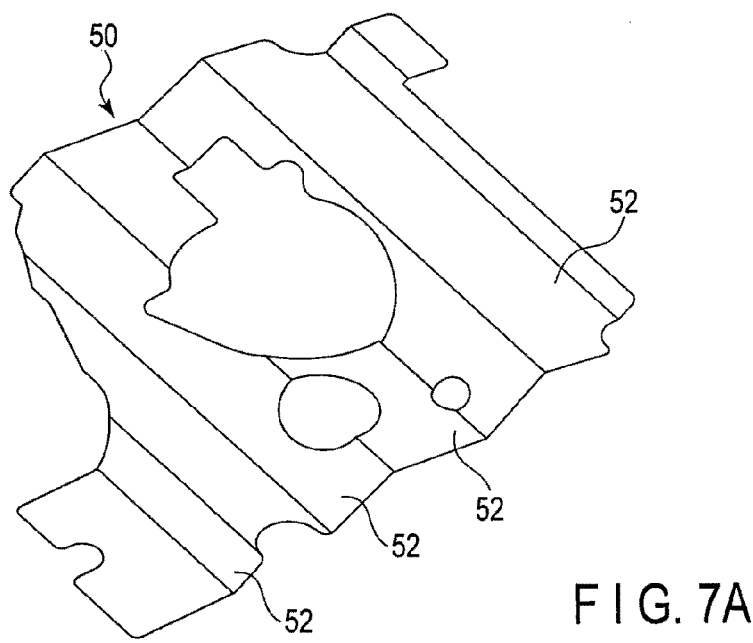
FIG. 7A is a perspective view showing an insulating sheet of an HDD according to a second embodiment.
Figure 7B:
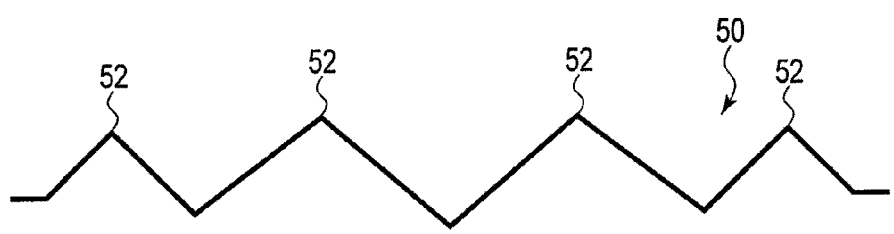
FIG. 7B is a sectional view of the insulating sheet of the second embodiment.

FIGS. 7A and 7B are perspective and sectional views, respectively, of an insulating sheet of an HDD according to a second embodiment. As shown in these drawings, an insulating sheet 50 is folded like a bellows and comprises a plurality of folded portions (or convex portions) 52 over its entire surface. The folded portions 52 are less in number than those of the first embodiment. The folded portions 52 project toward a base 12 or printed circuit board 40 or on both sides. Further, the folded portions 52 continuously extend parallel to one another in one direction from one side of the insulating sheet 50 to the other.

While the profile of each folded portion 52 is, for example, triangular, the folded portions 52 in the central portion of the insulating sheet 50 each form a triangle larger than the others or a triangle with a bending angle different from those of the triangles of the other folded portions 52. Further, height h of each folded portion 52 is not smaller than distance (clearance) D between the printed circuit board 40 and the outer surface of a housing 10. Respective heights h of the folded portions 52 are varied depending on the location, that is, on the clearance between the printed circuit board 40 and the outer surface of the housing 10.

Third Embodiment

Figure 8:
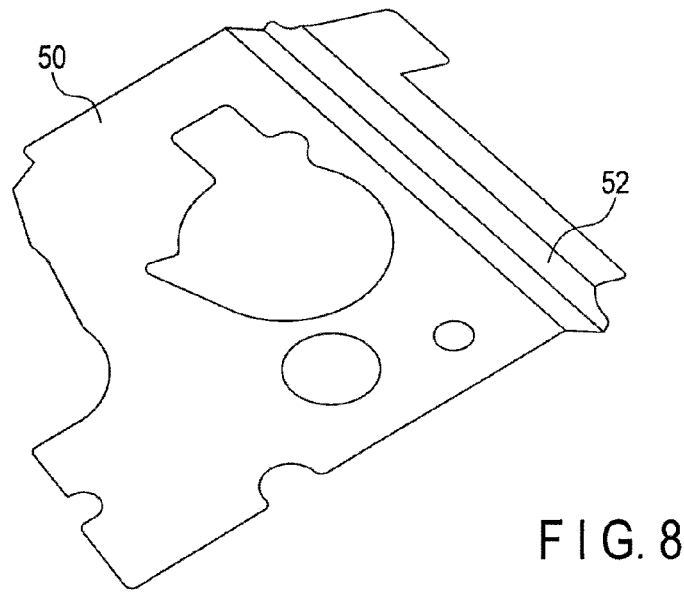
FIG. 8 is a perspective view showing an insulating sheet of an HDD according to a third embodiment.

FIG. 8 is a perspective view showing an insulating sheet of an HDD according to a third embodiment. According to the present embodiment, an insulating sheet 50 comprises a single folded portion (or convex portion) 52. The folded portion 52 continuously extends in one direction from one side of the insulating sheet 50 to the other. The profile of the folded portion 52 is, for example, triangular. In the present embodiment, the folded portion 52 is located in such a position that it can contact the printed circuit board 40 in the vicinity of rotational vibration sensors 44 or directly contact the sensors 44.

Fourth Embodiment

Figure 9:
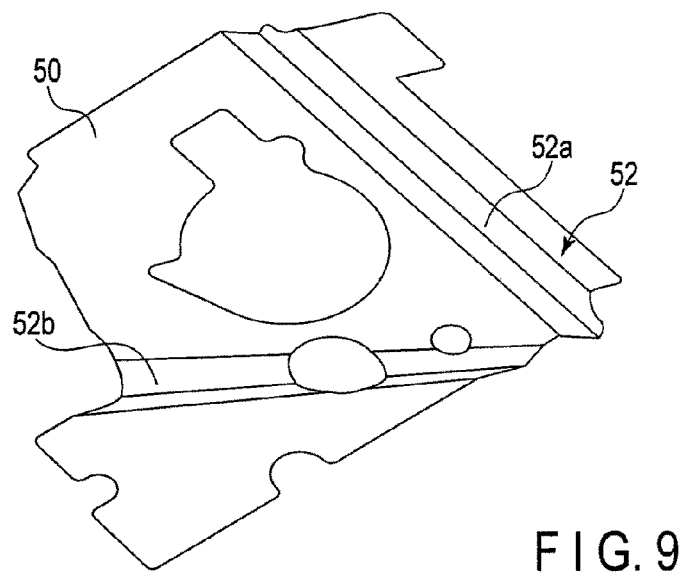
FIG. 9 is a perspective view showing an insulating sheet of an HDD according to a fourth embodiment.

FIG. 9 is a perspective view showing an insulating sheet of an HDD according to a fourth embodiment. According to the present embodiment, an insulating sheet 50 comprises a plurality (for example, two) of folded portions (or convex portions) 52a and 52b. These folded portions 52a and 52b continuously extend in different directions. The folded portion 52a continuously extends transversely relative to the insulating sheet 50 from one side thereof to the other. The folded portion 52b continuously extends at an angle to the extending direction of the folded portion 52a from the one side to the other. Further, the folded portions 52a and 52b are provided in positions corresponding to those places on a printed circuit board 40 where vibration is expected to be suppressed.

Fifth Embodiment

Figure 10:
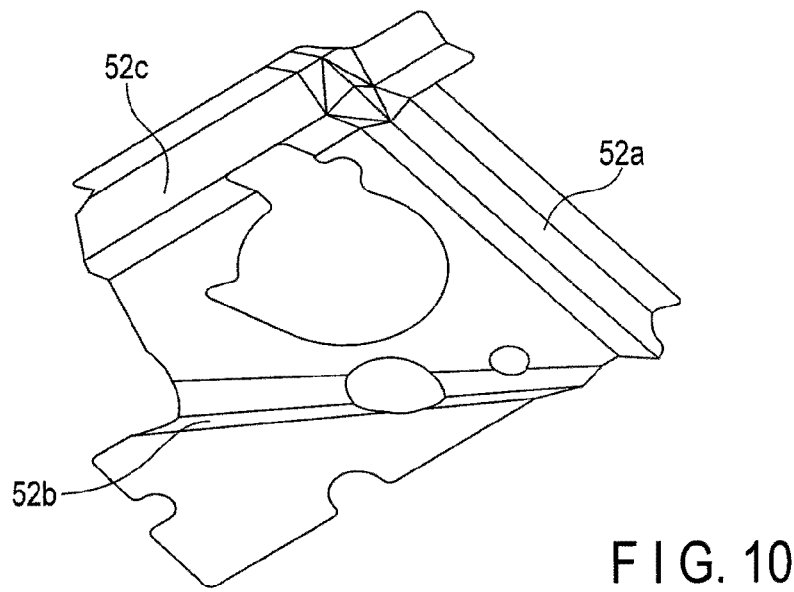
FIG. 10 is a perspective view showing an insulating sheet of an HDD according to a fifth embodiment.

FIG. 10 is a perspective view showing an insulating sheet of an HDD according to a fifth embodiment. According to the present embodiment, an insulating sheet 50 comprises a plurality (for example, three) of folded portions (or convex portions) 52a, 52b and 52c. The folded portions 52a and 52b continuously extend in different directions. Further, the folded portions 52a and 52c cross each other.

Sixth Embodiment

Figure 11:
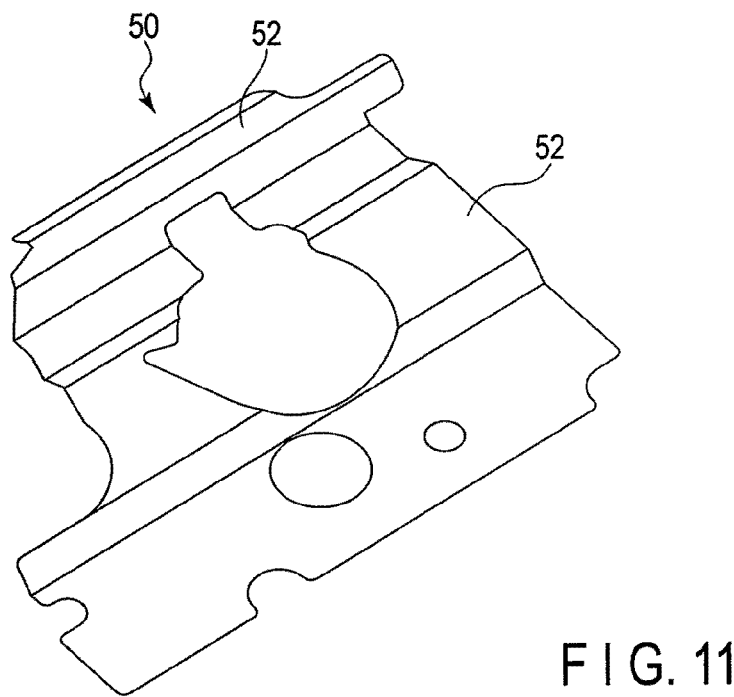
FIG. 11 is a perspective view showing an insulating sheet of an HDD according to a sixth embodiment.

FIG. 11 is a perspective view showing an insulating sheet of an HDD according to a sixth embodiment. According to the present embodiment, an insulating sheet 50 comprises a plurality of folded portions (or convex portions) 52. These folded portions 52 individually extend longitudinally relative to the insulating sheet 50. The profile of each folded portion 52 is, for example, trapezoidal. Further, the folded portions 52 are different in size (or width). For example, the folded portion 52 in the central portion of the insulating sheet 50 is wider than the other folded portions.

Figure 12A:
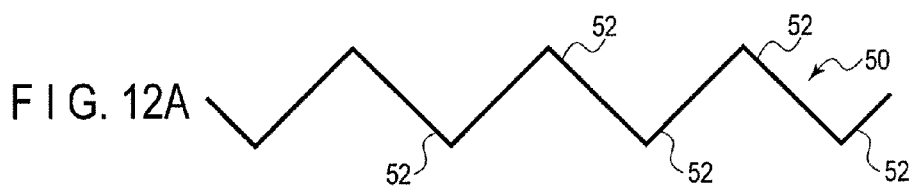
FIGS. 12A, 12B, 12C, 12D, 12E and 12F are sectional views individually showing convex portions of insulating sheets.
Figure 12B:
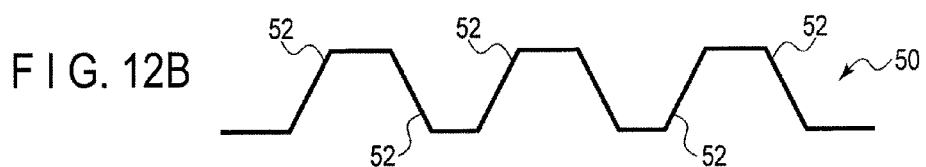
Figure 12C:
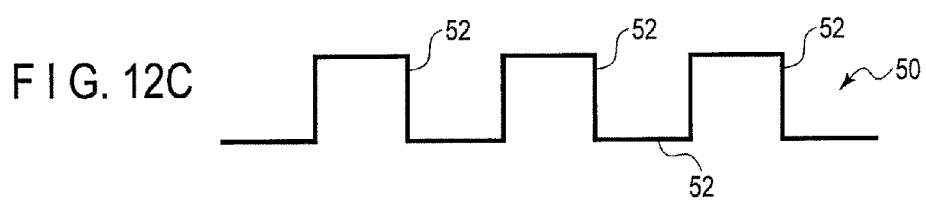
Figure 12D:
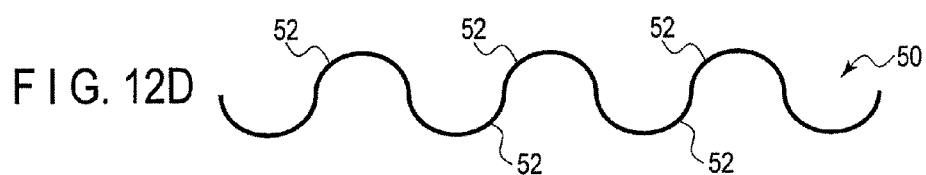
Figure 12E:
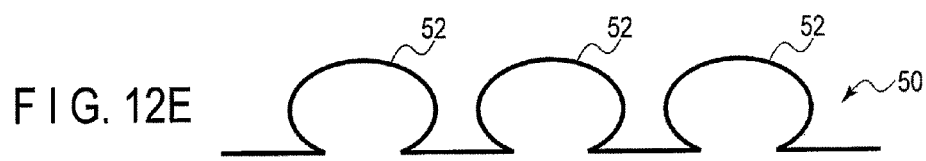
Figure 12F:
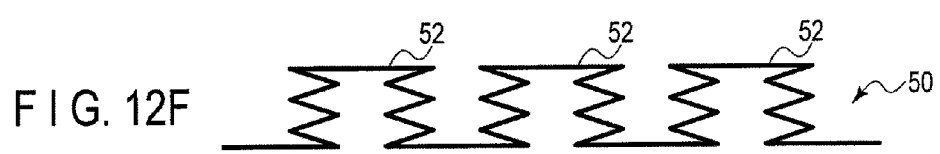

The profile of each folded portion 52 is not limited to the above-described triangle or trapezoid contour shown in FIG. 12A or 12B and may be of any of variously selectable contours. For example, the profile of each folded portion 52 may form a rectangular or round corrugation or be elliptical or bellows-shape, as shown in FIG. 12C, 12D, 12E or 12F, provided that it can produce a damping effect.

Seventh Embodiment

Figure 13:
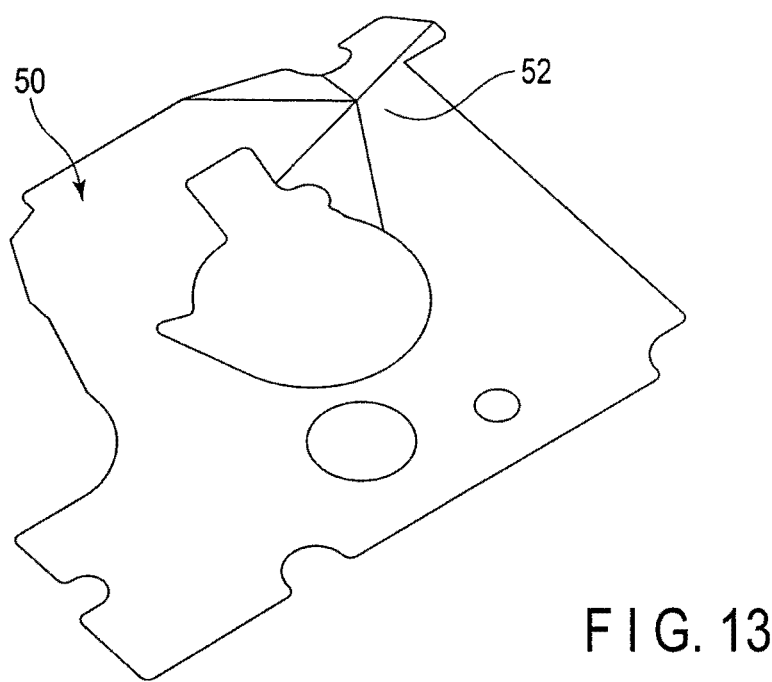
FIG. 13 is a perspective view showing an insulating sheet of an HDD according to a seventh embodiment.

FIG. 13 is a perspective view showing an insulating sheet of an HDD according to a seventh embodiment. According to the present embodiment, an insulating sheet 50 comprises a folded portion (or convex portion) 52. The folded portion 52 is in the shape of a pyramid or mountain formed by raising a part of the insulating sheet. Height h of the folded portion 52 is not smaller than distance (clearance) D between a printed circuit board 40 and the outer surface of a housing 10. The folded portion 52 is not limited to one in number, and a plurality of folded portions 52 may be provided.

According to any of the second to seventh embodiments arranged in this manner, there can be provided an insulating sheet and an HDD, reduced in cost and excellent in vibration suppression effect.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the magnetic disk is not limited to 2.5 inches in size and may be of another size. The installed magnetic disk is not limited to one in number and two or three or more magnetic disks may be installed. The number of suspensions of the head actuator may also be varied depending on the number of installed magnetic disks. The contour shape of the insulating sheet is not limited to those described in connection with the embodiments, and may be variously changed as required or depending on the device to which the insulating sheet is applied.

What is claimed is:

1. A disk device comprising:
a disk recording medium;
a drive motor configured to support and rotate the recording medium;
an actuator configured to support a head for movement relative to the recording medium;
a housing which accommodates the recording medium, the drive motor, and the actuator;
a printed circuit board opposed to an outer surface of the housing; and
an insulating sheet interposed between the printed circuit board and the outer surface of the housing,
the insulating sheet being made of a material having rigidity and elasticity and comprising at least one convex portion, the convex portion having a height not smaller than a clearance between the printed circuit board and the outer surface of the housing and being sandwiched between the printed circuit board and the outer surface of the housing.

2. The disk device of claim 1, wherein the convex portion of the insulating sheet continuously extends in one direction from one side of the insulating sheet to another side.

3. The disk device of claim 1, wherein the insulating sheet comprises a plurality of convex portions extending parallel to one another.

4. The disk device of claim 1, wherein the insulating sheet is folded like a bellows and comprises a plurality of parallel convex portions.

5. The disk device of claim 1, wherein the insulating sheet comprises a plurality of convex portions extending in different directions.

6. The disk device of claim 5, wherein one of the convex portions extend across the other convex portion.

7. The disk device of claim 1, wherein the insulating sheet comprises a plurality of convex portions having different heights.

8. The disk device of claim 1, wherein the insulating sheet comprises a plurality of convex portions having different profiles.

9. The disk device of claim 1, wherein the convex portion of the insulating sheet is in the shape of a mountain.

10. The disk device of claim 1, wherein the printed circuit board comprises a sensor configured to detect vibration and a control unit configured to control an operation of the actuator in response to the detection by the sensor.

11. An insulating sheet configured to be disposed between two members of a disk device to be insulated, the insulating sheet being a sheet of a material having rigidity and elasticity and comprising a convex portion formed by folding at least a part of the insulating sheet, the convex portion having a height not smaller than a clearance between the members to be insulated.

\* \* \* \* \*